July 22, 1952 — W. L. KELLY ET AL — 2,604,338
AUTOMATIC PIPE COUPLING
Filed May 19, 1950 — 3 Sheets-Sheet 1
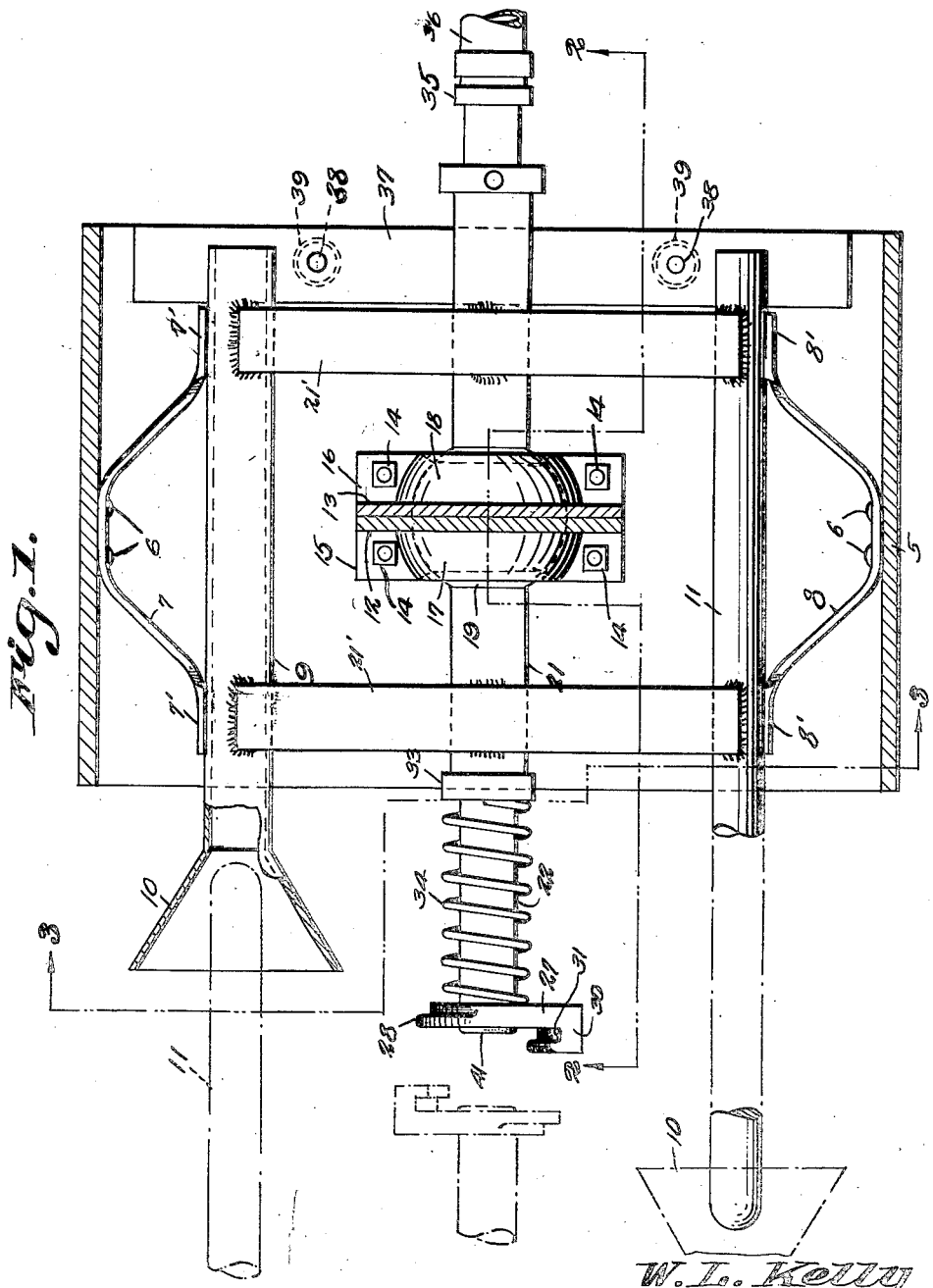
W. L. Kelly
Otto Pottberg
INVENTORS
BY *Athrow*&Co.
ATTORNEYS July 22, 1952 W. L. KELLY ET AL 2,604,338
AUTOMATIC PIPE COUPLING
Filed May 19, 1950 3 Sheets-Sheet 2
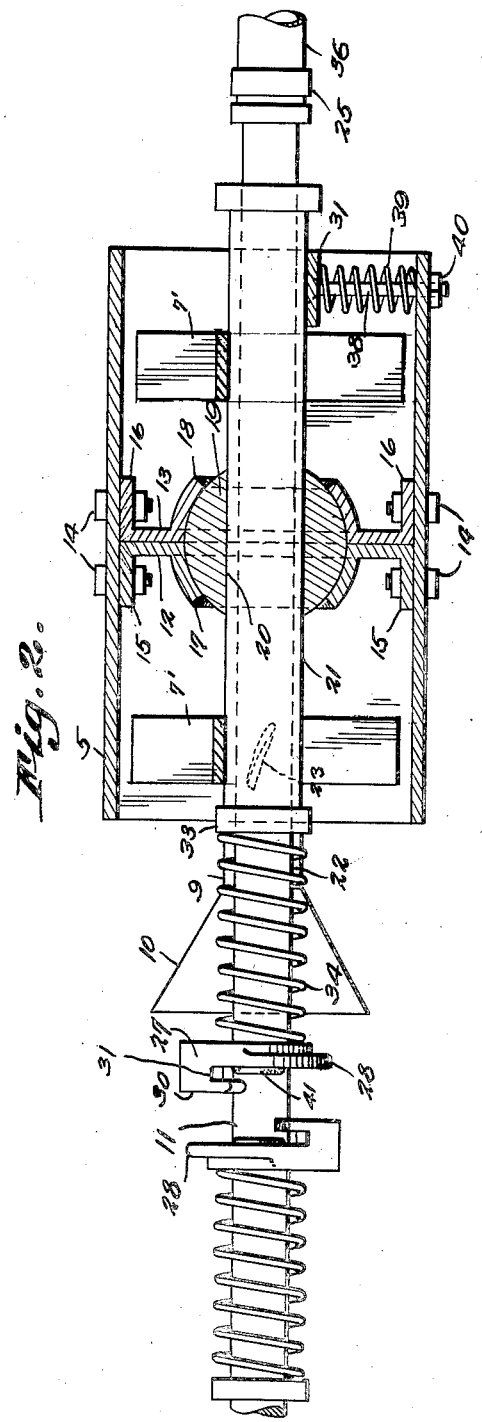
W. L. Kelly
Otto Pottberg
INVENTORS
BY
ATTORNEYS

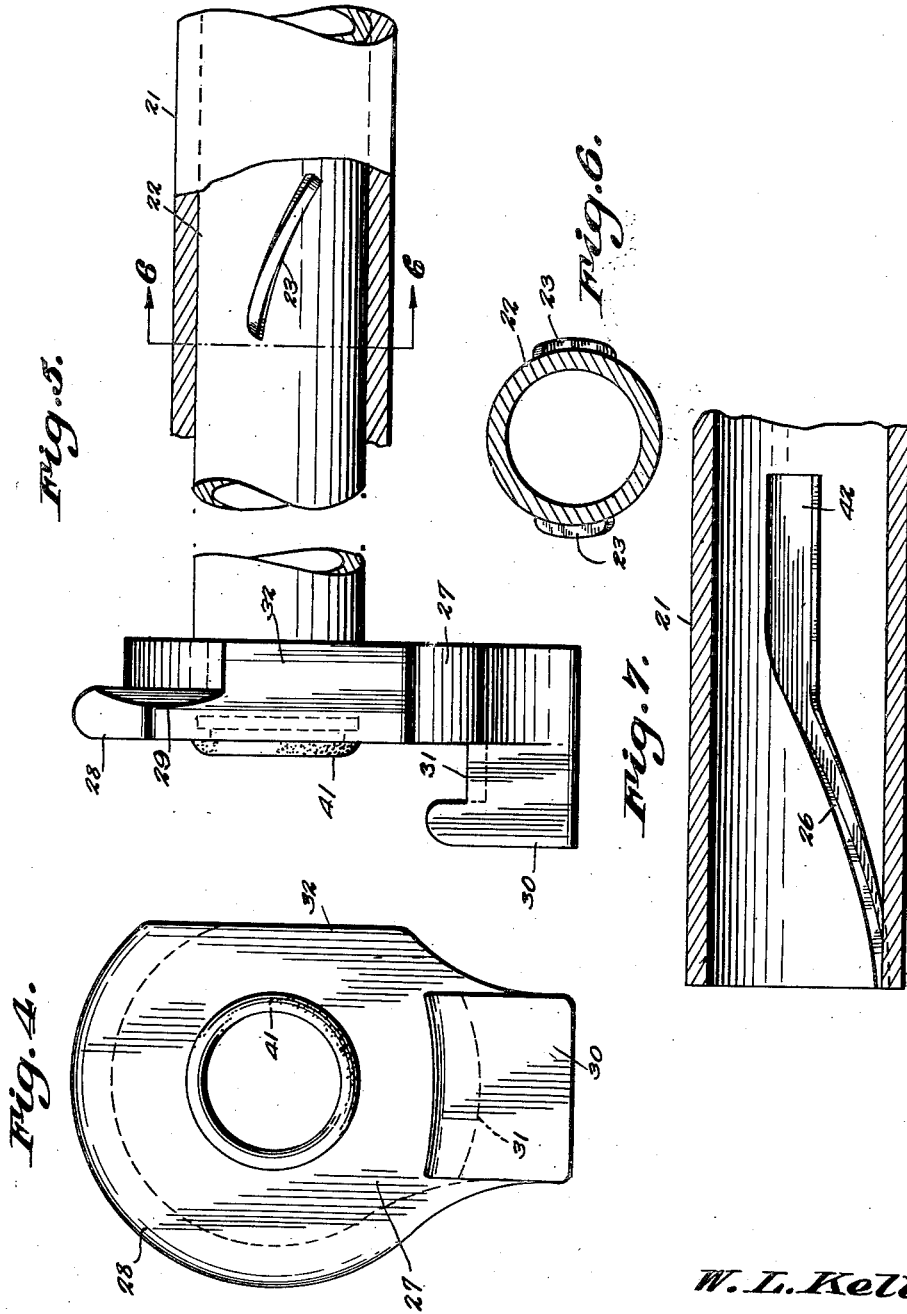

Patented July 22, 1952

2,604,338

UNITED STATES PATENT OFFICE 2,604,338

AUTOMATIC PIPE COUPLING

William L. Kelly and Otto Pottberg, Denham, Fla.

Application May 19, 1950, Serial No. 162,885

1 Claim. (Cl. 285—24)

1

This invention relates to an automatic coupling for the air hoses of railroad cars.

Conventionally, the air hoses of coupled railroad cars are joined by hand, it being necessary that one pass from car to car for the purpose of coupling said air hoses.

The present invention aims to eliminate this practice, by the provision of automatic pipe or air hose coupling means at the opposite ends of railroad cars, which will automatically couple the pipes of railroad cars, as said cars are being coupled together, and which will additionally act to uncouple the cars automatically.

When one is coupling the air pipes of adjacent cars, he grasps the air coupling of one car in one hand, and the air coupling of the other car in the other hand, brings them together, and twists them in opposite directions for the purpose of joining the cooperating fittings located on the ends of said air hoses. We propose to duplicate this exact motion automatically, by the provision of a novelly designed structure which, as the cars come together, will cause the air pipes to be guided into positions of axial alignment, after which they engage each other and automatically twist in opposite directions, said air pipes being so formed as to cause them to be sealably and tightly joined at their point of abutting relationship, as said twisting action progresses.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a horizontal sectional view through an air pipe coupling formed in accordance with the invention, said view being taken on the line 1—1 of Fig. 3, portions being broken away, the dotted lines indicating cooperating portions of a similarly formed coupling provided on an adjacent railroad car.

Fig. 2 is a section taken substantially on line 2—2 of Fig. 1.

Fig. 3 is a section taken substantially on line 3—3 of Fig. 1.

Fig. 4 is an enlarged end elevational view of the air pipe head.

Fig. 5 is a view partly in side elevation and partly in longitudinal section of said pipe head and adjacent portion of the coupling.

Fig. 6 is a section taken substantially on line 6—6 of Fig. 5.

Fig. 7 is a fragmentary longitudinal section through a tubular support for the air pipe.

Referring to the drawings in detail, we provide on the end of a railroad car an open-ended housing 5, which, as seen from Fig. 3, is in the present case rectangular in cross section. However, said housing can be of any suitable shape, without departure from the spirit of the invention.

In any event, secured by rivets 6 or any other suitable fastening means to the opposite side walls of the housing 5 are the spring yokes 7 and 8 respectively, the spring yokes 7 and 8 respectively being integral at opposite ends with vertical guide bars 7' and 8'. The spring yoke 7 and guide bars 7' serve as resilient guide means against which an elongated guide tube 9 has up-and-down sliding movement during train operation.

The guide tube 9 projects from one end of the housing 5 outwardly towards the adjacent railroad car, the projecting end of the guide tube being formed with a flared or funnel-shaped mouth 10. The spring yoke 8 and associated guide bars 8' mounted on the opposite side of the housing, similarly guides an elongated guide rod 11 that also projects outwardly towards the adjacent car.

By reference to Fig. 1, it will be seen that when adjacent cars come together, the guide rod 11 of one car will enter the flared mouth 10 of the guide tube of the other car, so that said guide rods 11 are guided into the cooperating tubes 9. This is for the purpose of aligning the air pipe coupling of one car axially with the air pipe coupling of the adjacent car, said pipe couplings to be described in detail hereinafter.

Mounted centrally within the housing 5 are upstanding bearing plates 12 and 13 mounted rigidly within the housing in back to back relationship by means of bolts 14 passing through top and bottom flanges 15 of the plate 12, and top and bottom flanges 16 of the plate 13. Plate 12 is formed with ball socket portion 17, while plate 13 is formed with ball socket portion 18, said socket portions, as seen from Fig. 2, cooperating to provide a socket for a ball 19 having the bore 20 in which is fixedly mounted the elongated tubular member 21 having slidable and rotatable therein the air pipe 22 formed (Figs. 5 and 6) with diametrically opposed spirally arranged ribs 23 and 24 received in opposed spiral grooves 25 and 26 formed in the inner surface of said tubular member 21.

Rigidly connecting together the guide tube 9, guide rod 11, and tubular member 21 for joint movement are the parallel substantially horizontal metal straps 21' welded at opposite ends to said guide tube and rod and at their centers to the member 21.

The air pipe 22 projects outwardly from one end of the tubular member 21, towards the adjacent railroad car, and a projecting end has the head 27 formed with peripheral flange 28 one end of which is of reduced thickness as at 29 for a purpose to be apparent. The head 27 is also formed with the lug 30 formed on its outer face, said lug 30 having the arcuate recess 31. Additionally one side of the head is cut off to provide a flattened cutaway part 32. Formed on the end of the tubular member 21 is the collar or cap 36, and interposed between said cap 33 and head 27 is the spring 34 surrounding the projecting portion of the air pipe 22, and normally urging said air pipe outwardly from the tubular member 21 and in the direction of the adjacent railroad car.

The heads of adjacent cars are so arranged relatively that when they are at their outermost limits, being urged to such positions by the springs 34, the lug 30 of one head will clear the flat surfaced portion 32 of the head it is to engage. As a result, this positions the flange 28 of each head in the plane of the recess 31 of the head to which it is to be coupled. As the railroad cars come together further, the air pipes 22 are pressed rearwardly within their tubular supports 21, and this sets up a rotative action of the respective air tubes in opposite directions, due to the movement of ribs 23 in the spiral grooves. As a result, the thin portions 29 of the flanges 28 are presented to and received within the arcuate recesses 31, and further rotative action of the heads ein opposite directions causes further movement of the flanges 28 through the recesses. This couples the heads securely together, automatically. It will be understood, of course, that the air pipes 22 of the adjacent cars will be axially aligned by the guide means comprising the guide tubes 9 and guide rods 11.

Each of the air pipes 22, at its inner or rear end, is connected by a fitting 35 to the flexible air hose 36 extending under the railroad car.

For the purpose of resiliently supporting the tubular supports 21 in proper position within the housings 5, we provide the transversely extended supporting bars 37 extending across the rear ends of the housings 5, the supporting bars 37 being elevated above the floor of the housing by means of rods 38, surrounded by springs 39 interposed between the housing floor and the supporting bar. Take-up nuts 40 on the rods 38 permit the tension adjustment of the springs and also permit adjustment of the supporting bars as to elevation within the housing.

It may be noted that the face of each of the heads 27 has recessed therein a projecting soft rubber bushing 41, and these bushings or gaskets when the heads are oppositely twisted into fully coupled relationship, sealably engage each other to prevent leakage of air between the coupled air pipes.

It may be further noted that relative railroad car positions are compensated for by the universal mounting 17, 18, 19, which permits flexing of the coupled connections during movement of the railroad cars over grades, around curves, and in other ways.

Similarly, the relative positions of cars may differ as they are coupled together, and the flared mouths 10 cause the alignment of the air pipe housings into exact positions of axial alignment before the heads 27 come together, and this is achieved even where the cars are being coupled while on minutely different grades or on curves.

As may be noted from Fig. 7, the grooves formed in the inner surface of the tubular support terminate in widened extension grooves 42 that extend along lines parallel to the axis of the tubular support and air pipe. The ribs move into these extension grooves at the time the heads of the connected air pipes have been relatively and oppositely rotated into their final positions of full engagement.

This permits a certain amount of longitudinal play in the engaged couplings that may result during the coupling of the cars, which play is permitted without further rotative movement of the heads past their positions of full engagement.

Additionally, the widening of the extension grooves permits a certain amount of rotative play or shifting of the heads within certain limits without tendency to uncouple the heads, during ordinary movement of the cars.

Uncoupling, of course, is also automatic and takes place when the coupling of one car is pulled in a direction away from that of the other car. This sets up reverse rotation of the coupling heads, out of engagement with each other.

What is claimed is:

An air pipe coupling comprising a housing, a tubular support universally mounted within said housing, a tubular guide having a flared mouth arranged parallel to said support within the housing at one side of the support, a guide rod arranged parallel to the tubular support within the housing and disposed at the opposite side of said support, the guide rod of one coupling being receivable in the tubular guide of an adjacent, identical though oppositely formed coupling, means rigidly connecting the support, guide, and guide rod, springs extending interiorly of and mounted on the housing, said springs extending from the opposite sides and bottom wall of the housing and being adapted to normally retain the support, guide, and rod in parallelism with the sides and bottom of the housing, said tubular support having a longitudinal, spiralling, interior groove, an air pipe slidable and rotatable within the tubular support, a rib exteriorly formed on the air pipe and received in the groove, for setting up rotative action of the air pipe on shifting of the air pipe longitudinally of the support, a peripheral flange on one end of the air pipe, a compression spring surrounding the air pipe and abutting at opposite ends against one end of the support and said flange for normally urging the air pipe outwardly of the support, a portion of said flange being cut away and the flange being of reduced thickness immediately adjacent said portion, a lug rigid with and projecting outwardly from said flange and having a recess adapted to receive an identical, oppositely formed flange of an adjacent like coupling, said cut away portion providing a clearance whereby the lug of one coupling may shift into the plane of the flange of said adjacent coupling preliminary to relative rotation of the air pipes of the respective couplings, the reduced thickness of said flange defining a cam surface whereby to tightly bind the coupled flanges.

WILLIAM L. KELLY.
OTTO POTTBERG.

REFERENCES CITED

The following references are of record in the file of this patent:

UNITED STATES PATENTS

| Number | Name | Date |
|---|---|---|
| 1,093,613 | Geiser | Apr. 21, 1914 |
| 1,245,774 | Robinson | Nov. 6, 1917 |
| 1,255,738 | Greene | Feb. 5, 1918 |
| 1,486,279 | Burchell | Mar. 11, 1924 |